UNITED STATES PATENT OFFICE.

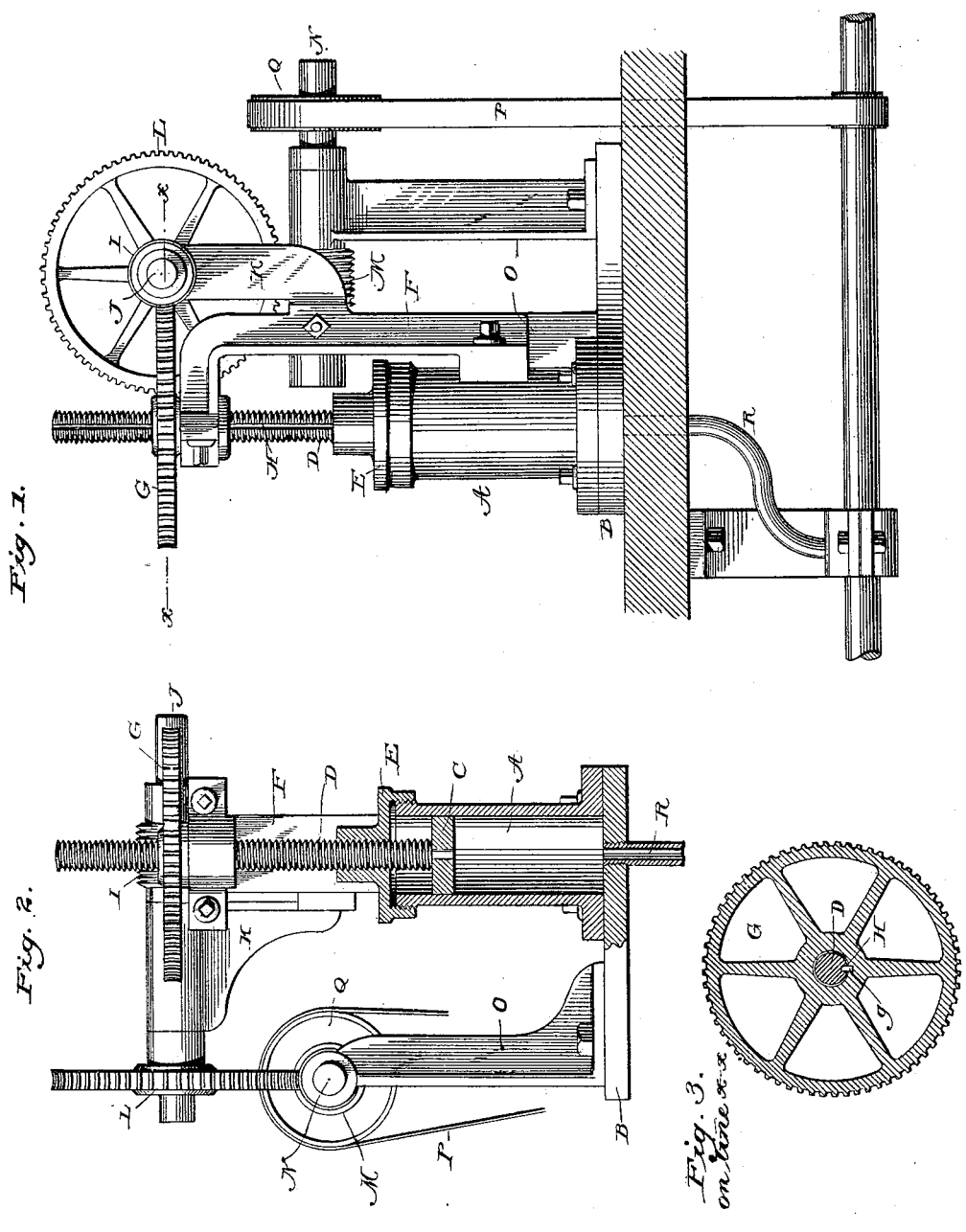

JOHN FITZ WILLIAM STAIRS, OF HALIFAX, NOVA SCOTIA, CANADA.

OILER.

SPECIFICATION forming part of Letters Patent No. 405,922, dated June 25, 1889.

Application filed December 14, 1888. Serial No. 293,652. (No model.)

*To all whom it may concern:*

Be it known that I, JOHN FITZ WILLIAM STAIRS, a citizen of Canada, residing in the city and county of Halifax, in the Province of Nova Scotia, Canada, have invented certain new and useful Improvements in Oilers; and I do hereby declare that the following is a full, clear, and exact description of the same.

My invention relates to that class of lubricators consisting of an upright cylinder having a discharge-opening for the lubricant and fitted with a piston which is slowly advanced by suitable gearing to deliver the lubricant.

The invention consists in combining, with a cylinder having a detachable head and a grooved and threaded piston-rod screwed into the head, a wheel through which the rod passes and by which it is turned, sustained in a bearing above the cylinder and at a distance therefrom, and suitable mechanism for revolving said wheel.

The invention further consists in the combination of parts and details of construction hereinafter described and claimed.

In the following detailed description of my invention, reference is had to the accompanying drawings, in which—

Figure 1 is a front view of the oiler belted from a shaft below. Fig. 2 is a side view, part being in section. Fig. 3 is a horizontal section on the line $x\ x$.

A cylinder A stands upon and is secured by bolts or screws to a cast-metal bed-plate B. A follower or piston C is accurately fitted to the bore of this cylinder, and is rigidly attached to a rod D, which projects up through a detachable cylinder-cover E and through a bearing in the top of a bracket F, which is fixed to the side of the cylinder A. The rod D is screw-threaded to match the screw-threaded opening in the cylinder-cover E, through which it passes, so that the turning of the rod in the cylinder-cover, which is tightly screwed on the upper end of the cylinder, as shown in Fig. 2, moves the piston up or down in the cylinder. A worm gear-wheel G is mounted in the top of the piston-rod bearing in the bracket F, and while the piston-rod D slides loosely through the eye of this wheel it is made to turn with it by a spline $g$, set in the eye of the wheel and projecting into the groove or keyway H, which is cut in the rod D and in which the spline is made to slide easily, and from this it will be seen that the turning of the wheel G will draw the rod D up through it. The wheel G is turned by the screw I, which is fixed on a spindle J, which is supported by a bracket K, fixed to the bracket F. The worm gear-wheel L is keyed on one end of the spindle J, and is turned by a screw M on the spindle N, which is journaled in bearings in the standards O, which are bolted to the bed-plate B. The screw M and spindle N are turned by a belt P, running from the pulley Q on the spindle N to any convenient part of the working machinery. Service-pipe R, for conveying the oil or lard to the different bearings, is fixed in the bottom of the cylinder.

It will be observed that the wheel G is journaled in the end of the overhanging arm F at a distance from the head of the cylinder. This arrangement is advantageous in that it permits the removal of the cylinder-head and piston without the necessity of removing the gearing.

In working this oiler the cover and piston are first removed from the cylinder, which is then filled with lard, the piston replaced and the cover screwed on the cylinder, and the belt applied for driving the oiler. The descent of the piston is extremely slow, but its operation insures sufficient and regular lubrication to every bearing.

What I claim as my invention is—

1. The cylinder provided with the detachable head, the piston having the grooved rod threaded through said head, in combination with the wheel through which the rod slides and by which it is turned, and the rigid wheel-sustaining arm overhanging the cylinder at a distance therefrom, whereby the removal of the cylinder-head and the withdrawal of the piston are permitted without disturbance of the wheel or its support.

2. In a lubricator, the stationary cylinder and its piston having the grooved and threaded rod, in combination with the arm overhanging the cylinder, the wheel G, journaled in said arm and encircling and engaging the piston-rod, the shaft J, with its worm and worm-wheel, and the shaft N, with its worm and driving-pulley.

Signed at Halifax this 22d day of November, 1888.

JOHN FITZ WILLIAM STAIRS.

In presence of—
  W. STAIRS DUFFUS,
  GEO. FOOT.